United States Patent
Reiche et al.

(10) Patent No.: US 8,833,167 B2
(45) Date of Patent: Sep. 16, 2014

(54) SENSOR DEVICE AND METHOD FOR OPERATING A SENSOR DEVICE

(75) Inventors: Martin Reiche, Weil der Stadt (DE); Michael Frank, Bretten (DE); Dirk Schmid, Simmozheim (DE); Peter Preissler, Dorndorf (DE); Karl-Heinz Richter, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 13/123,857

(22) PCT Filed: Aug. 24, 2009

(86) PCT No.: PCT/EP2009/060862
§ 371 (c)(1),
(2), (4) Date: Sep. 27, 2011

(87) PCT Pub. No.: WO2010/043438
PCT Pub. Date: Apr. 22, 2010

(65) Prior Publication Data
US 2012/0017684 A1 Jan. 26, 2012

(30) Foreign Application Priority Data
Oct. 14, 2008 (DE) .......................... 10 2008 042 820

(51) Int. Cl.
*G01N 29/09* (2006.01)
*G01H 3/00* (2006.01)

(52) U.S. Cl.
CPC ...................................... *G01H 3/005* (2013.01)
USPC .......................................................... 73/589

(58) Field of Classification Search
USPC .......................................................... 73/589
See application file for complete search history.

(56) References Cited

U.S. PATENT DOCUMENTS

| 6,053,028 A * | 4/2000 | Kraus et al. .................... 73/1.82 |
| 2003/0024298 A1 | 2/2003 | Baber et al. |

FOREIGN PATENT DOCUMENTS

| DE | 39 25 459 | 2/1991 |
| DE | 10 2005 057 973 | 6/2007 |
| JP | 11-150959 | 6/1999 |
| JP | 2007-90139 | 4/2007 |
| WO | 2008/141663 | 11/2008 |
| WO | 2008/157964 | 12/2008 |

OTHER PUBLICATIONS

J.D. Kearns, C.L. Davis, V.J. Mathews: "Sensor Health Diagnostics for Piezoelectric-Based SHM Systems"—Proceedings of the Sixth International Workshop on Structural Health Monitoring 2007, Sep. 11, 2007, XP008114988 pp. 1939-1946.

* cited by examiner

*Primary Examiner* — Hezron E Williams
*Assistant Examiner* — Gregory J Redmann
(74) *Attorney, Agent, or Firm* — Kenyon & Kenyon LLP

(57) ABSTRACT

A sensor device described having a sensor, in particular an ultrasound sensor, having a generating and detecting arrangement to generate and detect waves, in particular sound waves, the detection arrangement converting received waves into electric signals, and the electric signals being evaluable by an evaluation unit. A function-monitoring device is configured to determine an impedance characteristic curve of the sensor as a function of an excitation frequency is provided. Also described is a method for operating the sensor device.

15 Claims, 2 Drawing Sheets

SENSOR DEVICE AND METHOD FOR OPERATING A SENSOR DEVICE

FIELD OF THE INVENTION

The present invention relates to a sensor device having a sensor and TO a method for operating the sensor device.

BACKGROUND INFORMATION

A sensor device for distance measurement and a function test of the sensor are discussed in German patent document DE 10 2005 057 973 A1, for example.

This document discusses a method for function testing of an ultrasonic sensor on a motor vehicle in which such a strong ultrasonic signal is emitted in a test mode that under conventional conditions this ultrasonic signal will be reflected from the ground in front of the vehicle and received again.

This is a comparatively "rough" test.

SUMMARY OF THE INVENTION

An object of the exemplary embodiments and/or exemplary methods of the present invention includes providing a sensor device whose functional reliability is further improved.

This object may be achieved by the features described herein.

Advantageous refinements of the exemplary embodiments and/or exemplary methods of the present invention are also further described herein.

The exemplary embodiments and/or exemplary methods of the present invention are directed to a sensor device having a sensor, in particular an ultrasonic sensor having a generating and detecting arrangement for generating and detecting waves, in particular sound waves.

The detection arrangement convert waves, in particular sound waves, into electric signals, the electric signals being evaluable by an evaluation unit.

An aspect of the exemplary embodiments and/or exemplary methods of the present invention is that the sensor device according to the present invention has a function-monitoring device, which ascertains an impedance characteristic curve as a function of an excitation frequency.

The exemplary embodiments and/or exemplary methods of the present invention are based on the finding that reliable conclusions about the functional reliability of a sensor may be drawn from the shape of a characteristic curve. For example, individual sections of the characteristic curve may be evaluated for this purpose.

In general, the transmission and reception power of a sensor may be impaired by materials such as ice, snow and/or dirt (sludge).

When a sensor is dirty, it has an altered vibrational behavior because of a change in mass.

Furthermore, impaired functioning of a sensor may occur due to aging or a line rupture, for example.

Reliable information cannot be obtained about such impairments using the sensor devices known heretofore.

In an exemplary sensor, a sound transducer of the sensor is excited via its corresponding circuit to vibrate at a defined frequency (excitation frequency) for the determination of impedance, while at the same time the voltage level across the sound transducer is being measured.

The impedance is calculated from the quotient of the voltage and current, an impedance curve as a function of the excitation frequency having a characteristic shape.

Soiling or aging of a sensor is detectable by a change in shape of the corresponding impedance characteristic curve.

In an exemplary embodiment of the present invention, it is provided that the function-monitoring device is designed for comparing an existing impedance characteristic curve with an ascertained impedance characteristic curve.

Changes in the shape of the characteristic curve resulting in impaired functioning of a sensor in particular are easily detected by a comparison.

For example, a characteristic curve of a satisfactorily functioning sensor, in particular of the same type, this curve having been stored in the device, may be used for a comparison.

It is also conceivable to use for a comparison a characteristic curve obtained from a measurement by the sensor shortly after startup when satisfactory functioning may be assumed.

It additionally may be the case that the function-monitoring device is able to generate a monitoring signal in a comparison of impedance characteristic curves as a function of detected differences or in an analysis of the impedance characteristic curve.

In this case, the function-monitoring device is itself capable of performing an evaluation of a measured impedance characteristic curve or finding the relationship between a measured impedance characteristic curve and an existing impedance characteristic curve and drawing conclusions from this about the sensor.

This has the advantage that a monitoring signal generated in this way may be used to warn of defective functioning of the sensor, for example.

Generating a monitoring signal is advantageous in particular when an allowed degree of soiling has been exceeded, when a wire has broken, e.g., on the piezoelectric element, and/or when the transmitted and received signal is reduced to an intolerable extent due to aging.

It is also conceivable for the function-monitoring device not to evaluate a detected characteristic curve itself but instead to merely forward it to a control unit for evaluation. For example, a comparison with an existing impedance characteristic curve may also be performed in such a control unit.

Another exemplary embodiment of the present invention provides for a storage arrangement to be provided for storing impedance values.

The advantage of such a storage arrangement is that it is possible to access previously ascertained impedance values at any time to perform an evaluation of the functional reliability of the corresponding sensor.

A monitoring signal may be generated by a corresponding control unit.

In another exemplary embodiment of the present invention, it is provided that the function-monitoring device is designed to excite an amplitude comparable to that of a normal measuring operation when ascertaining the impedance characteristic curve.

Excitation to a comparable amplitude has the advantage that the normal measuring operation may be performed without interruption for an impedance measurement.

In addition, in another exemplary embodiment of the present invention, it is provided that the function-monitoring device is designed to excite a lower amplitude during an impedance measurement than that in a normal measuring operation.

Due to the excitation of the function-monitoring device at a lower amplitude, interfering frequency overlap may be prevented during the normal measuring operation.

In an exemplary embodiment of the present invention, it is provided that the function-monitoring device is designed to perform a measurement of the impedance in the pauses in the actual measuring operation of the sensor.

Therefore, the monitoring does not interfere with the normal measuring operation.

In particular there is no resulting reduction in the desired measuring cycles.

However, it is also conceivable that the function-monitoring device is designed to replace individual measuring cycles of the sensor by measuring cycles for measuring impedance. A sufficient number of measuring cycles will often be available for this.

In addition, the sensor or the measuring system may be configured to work at different frequencies during a normal measuring operation to detect an impedance characteristic curve at the same time with the aid of the function-monitoring device.

This mode of operation of the function-monitoring device has the advantage that interfering sound overlaying is avoided and the impedance measurement may be performed in the background.

In addition, in another embodiment of the present invention it is provided that the function-monitoring device is designed to determine parameters for an equivalent circuit of the sensor using the corresponding algorithms on the basis of the impedance characteristic curve, if necessary, a single impedance characteristic curve.

This has the advantage that the parameters are comparable individually and are capable of supplying essential information for evaluating the functional reliability of a sensor.

For an evaluation of the ascertained impedance characteristic curve at least one feature of the impedance characteristic curve is considered in order to be able to evaluate the electrical and acoustic properties of the sensor.

These features may be evaluated in absolute terms by comparing one feature with previous measuring results by a sensor or by comparison with standard values for sensors of a model series.

Another aspect of the present invention relates to a method for operating a sensor device having a sensor, in particular an ultrasonic sensor, the method being designed to generate and detect waves by a sensor device, so that the received waves are converted into electric signals and are evaluated in an evaluation unit.

The core of the method according to the present invention for operating a sensor device is that an impedance characteristic curve is ascertained as a function of the excitation frequency.

In another advantageous embodiment of the present invention, the method is designed to be able to determine parameters of an equivalent circuit diagram on the basis of the impedance characteristic curve.

An evaluation of the sensor on the basis of component parameters of the equivalent circuit diagram may be performed by determining an equivalent circuit diagram.

In another exemplary embodiment of the method according to the present invention, it is provided that in the manufacture of the sensor device, parameters for an equivalent circuit of the sensor are ascertained on the basis of an impedance characteristic curve measured at the time of manufacturing and the parameters are compared with predetermined parameters for an evaluation of functional reliability.

This has the advantage that the results of the evaluation are usable for the manufacturing operation and that necessary tests of the sensor devices may be eliminated in this way.

Additional features of the exemplary embodiments and/or exemplary methods of the present invention are derived from the following description of the figures.

DETAILED DESCRIPTION

Figure 1:
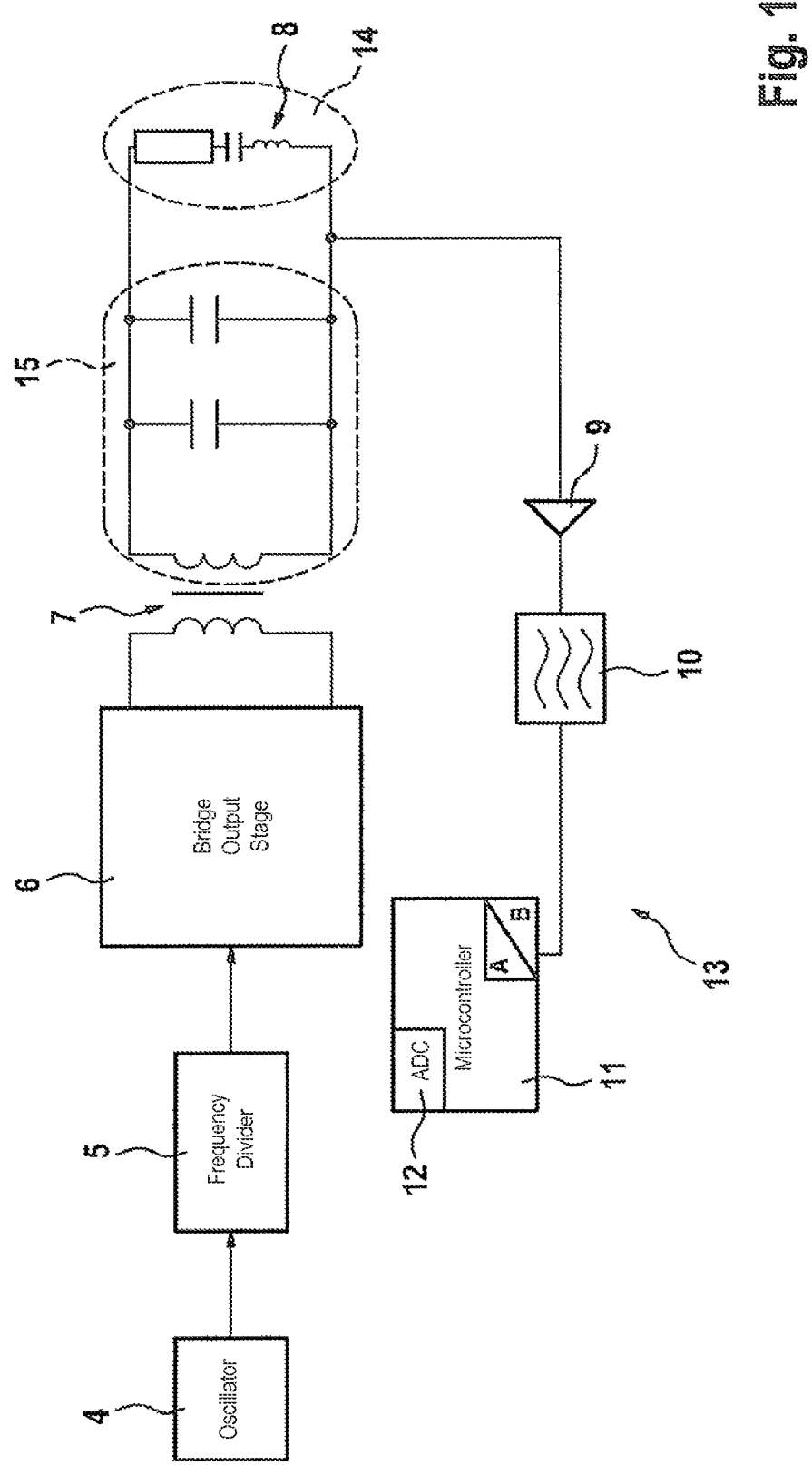
FIG. 1 shows a block diagram of a sensor device having a monitoring device.

FIG. 1 shows a block diagram of an exemplary sensor device 13 equipped with a function-monitoring device according to the present invention.

The circuit of sensor device 13 includes an oscillator 4 for generating a required frequency, a frequency divider 5 for generating different frequencies, a bridge output stage 6, a transformer 7 and an electroacoustic sound transducer 8. Electroacoustic sound transducer 8 may be represented as a series oscillating circuit 14 in an equivalent circuit diagram, the electric circuit being designed as a parallel oscillating circuit 15.

For detecting impedance, a resulting voltage level across sound transducer 8 is measured. For this purpose, a pickup is formed in series oscillating circuit 14 of sound transducer 8, the resulting voltage level being ascertained by an amplifier 9, a downstream bandpass filter 10, and a following A/D converter 12 in microcontroller 11. This voltage signal is used to calculate impedance.

Alternatively, the voltage signal across a comparator may be evaluated.

The impedance is formed by forming a quotient of the ascertained voltage signals and a known amperage, the impedance values optionally being used for an impedance characteristic curve 1, 2, 3.

The ascertained impedance values for forming characteristic curves may be evaluated in comparison with impedance values ascertained previously and stored for a characteristic curve of a functional sensor.

Conclusions about the functional reliability of the sensor may be drawn by comparing a generated impedance curve of a dirty sensor, for example, or an age-impaired sensor with the curve of a stored reference characteristic curve, because functional impairment of a sensor due to soiling, for example, has a negative effect on the transmission and reception performance of the sensor and results in a deviating impedance curve accordingly with respect to an impedance curve of a sensor which is not dirty.

Figure 2:
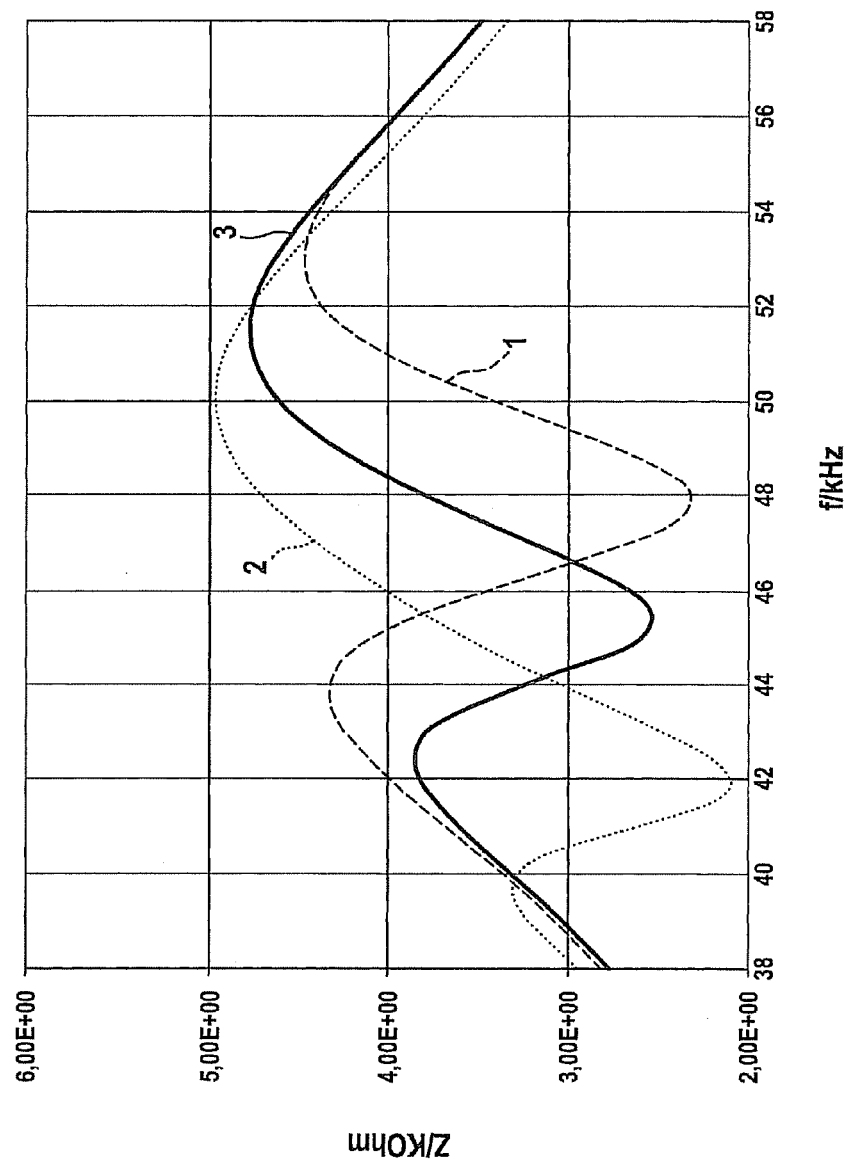
FIG. 2 shows a graphic comparison of the plot of impedance as a function of the frequency of an exemplary sensor in various states of use.

FIG. 2 shows the shape of various impedance characteristic curves 1, 2, 3 of a sensor device 13, an impedance characteristic being represented graphically in a diagram, in which the X axis is defined as the frequency axis and the Y axis is defined as the impedance axis, for example.

The impedance characteristic curve labeled with reference numeral 1 is obtained by using a conventional circuit of an ideally tuned ultrasonic sensor. The circuit is assumed to be an electroacoustic sound transducer 8, including one parallel and one series oscillating circuit 14 connected to an electrical parallel oscillating circuit 15 in the equivalent electric circuit diagram. Alternatively, however, other circuits are also possible.

This shows a condition of an ultrasonic sensor not impaired due to soiling or aging.

To determine the impedance curve, the resulting voltage level [U] across sound transducer 8 is measured at a predetermined current [I] and at a predetermined frequency [f].

The measurement is performed at various frequencies, for example, continuously increasing frequencies to obtain an impedance characteristic curve as a function of frequency. The impedance is obtained here by forming a quotient of voltage and current.

Impedance characteristic curve 1 may be used as a reference characteristic curve for comparison with continuously detected impedance characteristic curves 2, 3 of the sensor.

FIG. 2 shows an impedance characteristic curve labeled with reference numeral 2, where the function of the sensor is impaired due to soiling, for example.

The transmission and reception performances of the sensor are impaired due to soiling in such a way that, for example, the shape of the curve in a rather large range of minimal values and maximal values for the impedance is in a lower frequency range.

The shape of an impedance characteristic curve labeled with reference numeral 3 in FIG. 2 illustrates a sensor whose functional impairment is attributable to aging of the sensor as an example.

The shape of the impedance curve between impedance characteristic curves 1 for a sensor without functional impairment and impedance characteristic curve 2 of a sensor having functional impairment due to soiling lies in a middle frequency range of these two impedance characteristic curves 1, 2.

From this comparison of an existing impedance characteristic curve 1 with an ascertained impedance characteristic curve 2 and/or 3, conclusions as to the degree of soiling or aging of the sensor, for example, may be drawn in the event of a possible deviation.

The position and size of extreme values may be used for evaluation.

Measured and stored impedance values and any comparative values may be sent to a control unit, for example, for evaluating a comparison.

This control unit then performs an evaluation of the impedance values, a corresponding evaluation resulting in generation of a response which shuts down the sensor in the event soiling is detected, for example, and additionally outputs a monitoring signal.

What is claimed is:

1. A sensor device, comprising:
    an ultrasonic sensor including:
        a generating arrangement configured to generate waves; and
        a detecting arrangement configured to receive waves and to convert the received waves into electric signals, which are evaluatable by an evaluating unit; and
    a function-monitoring device configured to ascertain an impedance characteristic curve of the sensor as a function of an excitation frequency;
    wherein the function-monitoring device is configured to excite a lower amplitude during an impedance measurement in comparison with a normal measuring result.

2. The sensor device of claim 1, wherein the function-monitoring device is configured to compare the ascertained impedance characteristic curve with an existing impedance characteristic curve.

3. The sensor device of claim 1, wherein the function-monitoring device is able to generate a predetermined monitoring signal when comparing impedance characteristic curves, as a function of detected differences or in evaluating a detected impedance characteristic curve.

4. The sensor device of claim 1, further comprising:
    a memory to store impedance values.

5. The sensor device of claim 1, wherein the function-monitoring device is configured to excite an amplitude comparable to a normal measuring operation in ascertaining the impedance characteristic curve.

6. The sensor device of claim 1, wherein the function-monitoring device is configured to determine parameters for an equivalent circuit of the sensor, using algorithms based on the impedance characteristic curve.

7. The sensor device of claim 1, wherein standard values for sensors of predetermined model series are stored in the function-monitoring device for a comparison.

8. The sensor device of claim 1, wherein the function-monitoring device obtains measured values from the corresponding sensors for a comparison.

9. The sensor device of claim 1, wherein the function-monitoring device is configured to perform an impedance measurement during pauses of a conventional measuring operation of the sensor.

10. The sensor device of claim 1, wherein the function-monitoring device is configured to replace individual measuring cycles of the sensor by measuring cycles for measurement of the impedance.

11. The sensor device of claim 1, wherein the function-monitoring device is configured to operate at different frequencies in normal measuring operation to be able to detect an impedance characteristic curve at the same time.

12. A method for operating a sensor device, the method comprising:
    generating waves;
    detecting the waves with an ultrasonic sensor;
    converting the detected waves into electric signals; and
    evaluating the electric signals in an evaluation unit, wherein an impedance characteristic curve of the sensor is ascertained as a function of an excitation frequency;
    wherein the sensor device includes the ultrasonic sensor, the ultrasonic sensor including a generating arrangement and a detecting arrangement configured to generate and detect waves;
    wherein the detecting arrangement converts received waves into electric signals, which are evaluatable by an evaluating unit, and a function-monitoring device is configured to ascertain an impedance characteristic curve of the sensor as a function of an excitation frequency; and
    wherein the function-monitoring device is configured to excite a lower amplitude during an impedance measurement in comparison with a normal measuring result.

13. The method of claim 12, wherein the instantaneously measured impedance characteristic curve is compared with an existing impedance characteristic curve of the sensor, and wherein a predetermined monitoring signal is output as a function of differences detected in the comparison of the impedance characteristic curves.

14. The method of claim 13, wherein parameters for an equivalent circuit of the sensor are ascertained based on an impedance characteristic curve.

15. The method of claim 14, wherein parameters for an equivalent circuit of the sensor are ascertained based on an impedance characteristic curve measured in manufacturing the sensor device, and wherein the parameters are compared with predetermined parameters for an evaluation of functional reliability.

* * * * *